United States Patent [19]
Choate

[11] Patent Number: 5,993,009
[45] Date of Patent: Nov. 30, 1999

[54] MULTIPLE MAGNIFICATION CONTOUR PROJECTOR

[75] Inventor: Albert G. Choate, Rush, N.Y.

[73] Assignee: Optical Gaging Products, Inc., Rochester, N.Y.

[21] Appl. No.: 09/039,373

[22] Filed: Mar. 16, 1998

[51] Int. Cl.[6] .................................................. G03B 21/261
[52] U.S. Cl. ............................ 353/80; 353/66; 353/101; 356/391
[58] Field of Search .................................. 353/76, 64, 63, 353/65, 74, 79, 80, 101, 66, 67, 121; 359/369; 356/376, 391

[56] References Cited

U.S. PATENT DOCUMENTS

| | | | |
|---|---|---|---|
| 2,552,238 | 5/1951 | Turner et al. | 356/391 |
| 2,552,272 | 5/1951 | Fultz | 356/391 |
| 2,552,280 | 5/1951 | Hudak | 356/391 |
| 2,742,815 | 4/1956 | Dietrich et al. | 353/80 |
| 2,804,800 | 9/1957 | Stevens | 356/391 |
| 2,853,920 | 3/1958 | Malfeld et al. | 356/391 |
| 5,402,192 | 3/1995 | Gelman | 353/78 |
| 5,402,193 | 3/1995 | Choate | 353/80 |
| 5,619,031 | 4/1997 | Choate | 350/201.2 |
| 5,668,665 | 9/1997 | Choate | 359/663 |

*Primary Examiner*—William Dowling
*Attorney, Agent, or Firm*—Shlesinger, Fitzsimmons & Shlesinger

[57] ABSTRACT

Several different magnification lenses are adjustably mounted in a contour projector housing for movement selectively and one by one into operative registry with an entrance lens that faces a workpiece that is to be inspected. Spaced illuminators in the housing direct light beams onto opposite sides of the workpiece to produce combined profile and surface images thereof that are projected by the entrance lens and the registering magnification lens onto the reflective surface of a first mirror. This mirror projects the combined, magnified images in the housing onto a second mirror, which then projects the combined images onto a projection screen mounted in the housing for observation by the person using the projector.

10 Claims, 3 Drawing Sheets

MULTIPLE MAGNIFICATION CONTOUR PROJECTOR

BACKGROUND OF THE INVENTION

This invention relates to contour projectors, and more particularly to contour projectors of the type having a fixed or stationary screen onto which enlarged images of workpieces are projected for observation by an operator. Even more particularly this invention relates to an improved contour projector of the type described which includes a plurality of interchangeable magnification lenses having internalized telecentric stops, and which may be indexed selectively into registry with the optical axis of the projector in order to provide considerably higher magnifications of the projected workpiece image then was heretofore possible.

Prior art contour projectors of the type described typically utilize surface illumination which is directed in one direction along the optical axis onto the surface of the workpiece that is to be inspected, and in such manner that the image of the workpiece is projected in the opposite direction along the optical axis to the screen onto which the image is to be projected. This is the most effective way of illuminating normal flat surfaces, and to view into blind cavities or recesses formed in the surfaces that are being inspected. My U.S. Pat. No. 5,402,193, for example discloses a contour projector which discloses a light source for projecting a beam of light through a beamsplitter onto one side of a workpiece, so that the image of the illuminated side of the workpiece is projected rearwardly along the optical axis to the beamsplitter, which then projects the image through a set of magnification lenses onto a stationary screen for observation by an operator.

While the projector disclosed in my above-noted U.S. patent enables near normal surface illumination by injecting light surrounding the telecentric stop of an optical relay system, this invention incorporates a conventional beamsplitter that provides true normal illumination. In addition to not requiring an optical relay, the current invention can provide illumination and imaging at much higher apertures or lower F-number, with associated higher resolution and greater brightness, than otherwise possible. In this invention, the entrance lens is essentially only half of a relay, which still includes the desireable attributes of a fixed lens and large constant working distance.

Inspection devices emobdying different magnification lenses have been developed, as disclosed for example in my U.S. Pat. No. 5,668,665. The device disclosed therein, however, is designed for transmitting images to a video camera, which in turn transmits the images to a monitor for observation by an operator or for computerized analysis. However, although such apparatus increases magnification of the images, contour projector systems of the type disclosed herein require considerably higher magnifications and larger fields than video applications of the type disclosed in my above-noted patent. And unlike the novel system disclosed herein, the above-noted video system has telecentric stops that are external on the interchangable portions of the system, and such prior system does not offer means for adjusting the exact magnification.

It is an object of this invention, therefore, to provide an improved contour projector having an optical system including a plurality of interchangeable telecentric parfocal magnification lenses which can be indexed selectively and one-by-one into registry with the optical axis of a stationary entrance lens assembly in order to project images of different precise magnifications onto the associated projector screen.

Another object of this invention is to provide an improved contour projector of the type described which employs a plurality of different magnification lenses which can be shifted selectively and one-by-one into registry with a fixed entrance lens assembly, and which eliminate the need for employing relay lenses for transmitting an image to the associated display screen, while maintaining fixed exposed lenses and a constant large working distance.

Other objects of this invention will be apparent hereinafter from the specification and from the recital of the appended claims, particularly when read in conjunction with the accompanying drawings.

SUMMARY OF THE INVENTION

The projector includes a housing having thereon a support for releasably securing a workpiece on the housing in registry with a common entrance doublet lens. This entrance lens is mounted in the housing with its inlet end facing the workpiece, and with its outlet end facing the inlet end of one of several different magnification lenses, which are adjustably mounted in the housing for movement selectively, and one by one, into operative registry with the entrance lens. Spaced illuminators in the housing direct light beams onto opposite sides of the workpiece, thereby producing combined profile and surface images of the workpiece that are projected by the inlet lens and the registering magnification lens onto the reflective surface of a first mirror. This mirror projects the combined images in the housing onto the reflective surface of a second mirror, which then projects the magnified, combined images onto a projection screen that is mounted in the housing for observation by the person using the projector.

THE DRAWINGS

FIG. 1 is a side elevational view of a contour projector made according to one embodiment of this invention, the projector containing a plurality of sets of magnification lenses that are indexible selectively, and one set at a time, into registry with the projector's entrance lens system, portions of the projector housing being broken away to show one such set of magnification lenses as they appear when positioned in an operative position in which the set registers with the entrance lens system;

DETAILED DESCRIPTION OF THE PREFERRED EMBODIMENT

Figure 1:
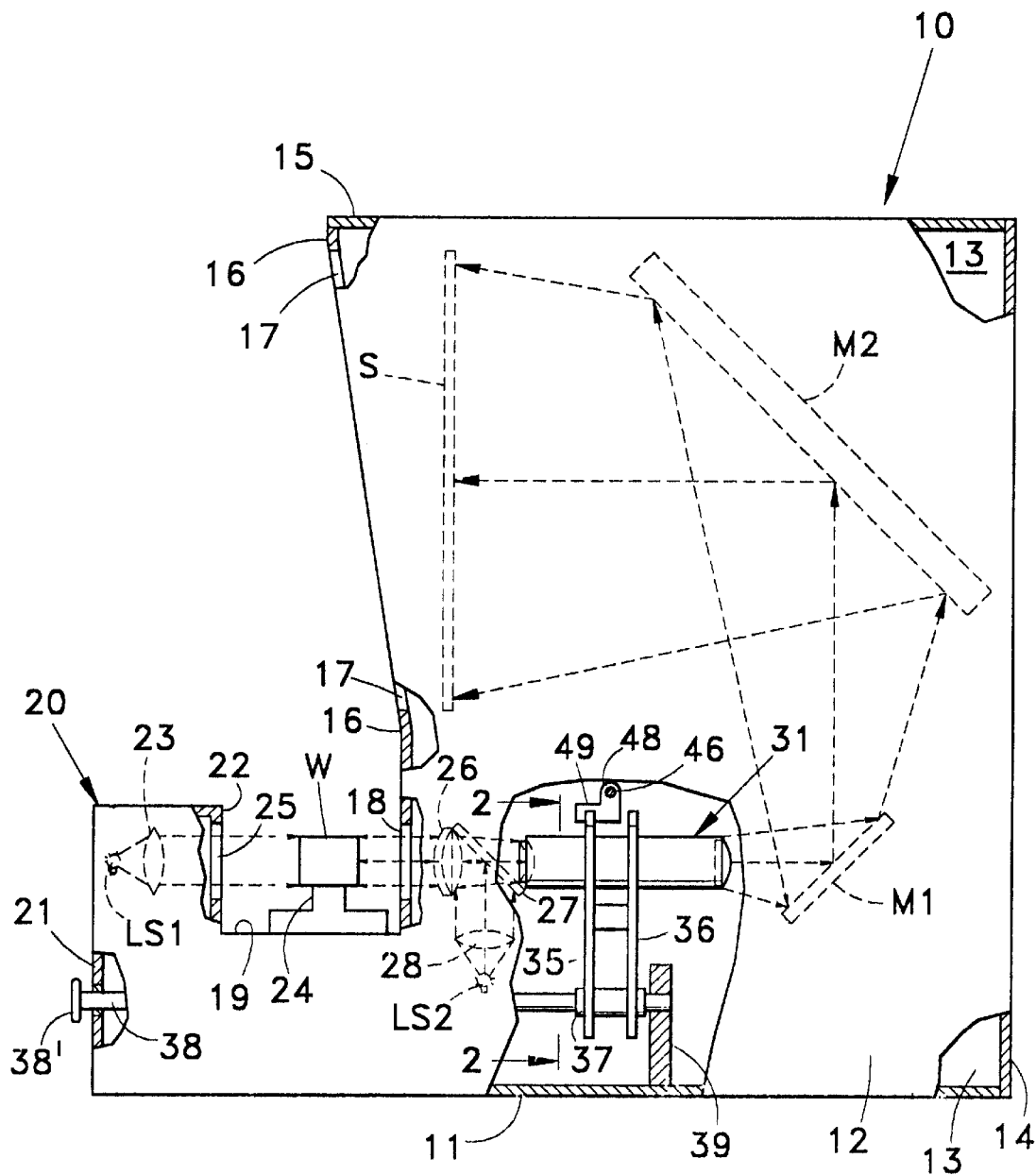

Referring now to the drawings by numerals of reference, and first to FIG. 1, 10 denotes generally a contour projector housing having a plane bottom wall 11, spaced, parallel sidewalls 12 and 13, and a plane, vertically disposed rear wall 14 extending at right angles between the sidewalls 12 and 13. Projecting from the upper edge of wall 14 parallel to the bottom wall 11 and partway towards the front end of the housing 10 (the left end as shown in FIG. 1) is the top housing wall 15, the forward edge of which is secured to the upper edge of a downwardly inclined forward wall 16. Wall 16 has therein adjacent its upper end a large, central opening 17 which registers with a screen S that is mounted in housing 10 rearwardly of wall 16, and adjacent its lower end has therein another opening 18 for a purpose noted hereinafter.

Adjacent its forward end housing 10 has formed thereon a low, work supporting surface 19 which extends horizontally beyond the lower edge of wall 16, and which terminates at a forward portion 20 of housing 10 that extends slightly above surface 19. Mounted between the front and rear walls 21 and 22 of portion 20 is a profile illuminator in the form of a light source LS1, and an adjacent collimator lens 23. Surface 19 has mounted thereon a conventional work support 24, which is operable removably to support thereon a workpiece W in registry with the lens 23 through an opening 25 in the housing 10, and with the opening 18 in wall 16.

In use, the light source LS1 and the lens 23 are disposed to project a profile of the workpiece W through the opening 18 in the housing wall 16, and onto a fixed, common entrance doublet lens 26, which is mounted in housing 10 rearwardly of and in registration with the opening 18 in wall 16. Mounted in housing 10 rearwardly of and in registration with the entrance lens 26 is a beamsplitter 27, which lies in a plane inclined at approximately forty-five degrees to the axis of the lens 26, and which overlies a second light source LS2 and associated collimator lens 28 that are mounted in the housing 10 beneath the beamsplitter. Light from the source LS2 and its lens 28 is reflected by the beamsplitter 27 forwardly through the entrance lens 26 and onto the rear or right hand surface (FIG. 1) of the workpiece W. An image of this illuminated surface is reflected rearwardly through the common entrance lens 26 along with the above-noted profile image, both such images then passing through the beamsplitter 27 and through the inlet of a magnification lens 31, which forms one of several, interchangeable magnification lenses that are mounted, as noted hereinafter, for registration selectively with the images transmitted through the beamsplitter 27.

As shown in FIG. 1, the output of lens 31 registers with and projects the combined contour and rear surface images of the workpiece W onto the reflective surface of a first mirror M1, which is mounted in housing 10 adjacent its rear wall 14 with its reflective face or surface facing upwardly in the housing 10 and lying in a plane inclined at forty-five degrees of the vertical. As shown by the broken lines in FIG. 1, therefore, the combined images from the lens 31 are projected upwardly onto the lower surface of a second mirror M2, which is mounted in housing 10 above the mirror M1, and the reflective surface of which registers with the screen S, and lies in a plane inclined at approximately forty-five degrees in the vertical. Thus the combined images transmitted by the lens 31 are magnified and reflected by mirror M1 to mirror M2, which in turn projects enlarged, registering images of the profile and rear surface of the workpiece W onto screen S.

Lens 31 is one of a plurality (three in the embodiment illustrated) of magnification lenses 31, 32 and 33 which are mounted in housing 10 for movement selectively into an operative position in which the respective magnification lens is positioned between the beamsplitter 27 and the mirror M1, as illustrated for example by lens 31 as shown in FIG. 1. For this purpose each lens 31, 32 and 33 is secured intermediate its ends in one of three, spaced pairs of registering, circular openings formed in a pair of spaced, parallel lens supporting plates 35 and 36 adjacent the upper ends thereof. Plates 35 and 36, which are similar in configuration, and which are generally segmental, arcuate in configuration, are secured at their lower ends to a sleeve 37 that is fixed to a lens adjusting shaft 38 that is mounted in housing 10 adjacent and parallel to the bottom wall 11 thereof for limited rotational movement. More specifically, shaft 38 is rotatably mounted at its inner end in an opening in a stationary bracket or support 39 which is fixed to and extends from the upper surface of the bottom housing wall 11 partway into the housing 10. At its opposite or outer end shaft 38 extends through the wall 21 of portion 20 of the housing and has secured thereon a circular handle or knob 38' which can be utilized for manually rotating shaft 38 selectively in opposite directions, and in the embodiment illustrated into any one of three different positions.

Figure 2:
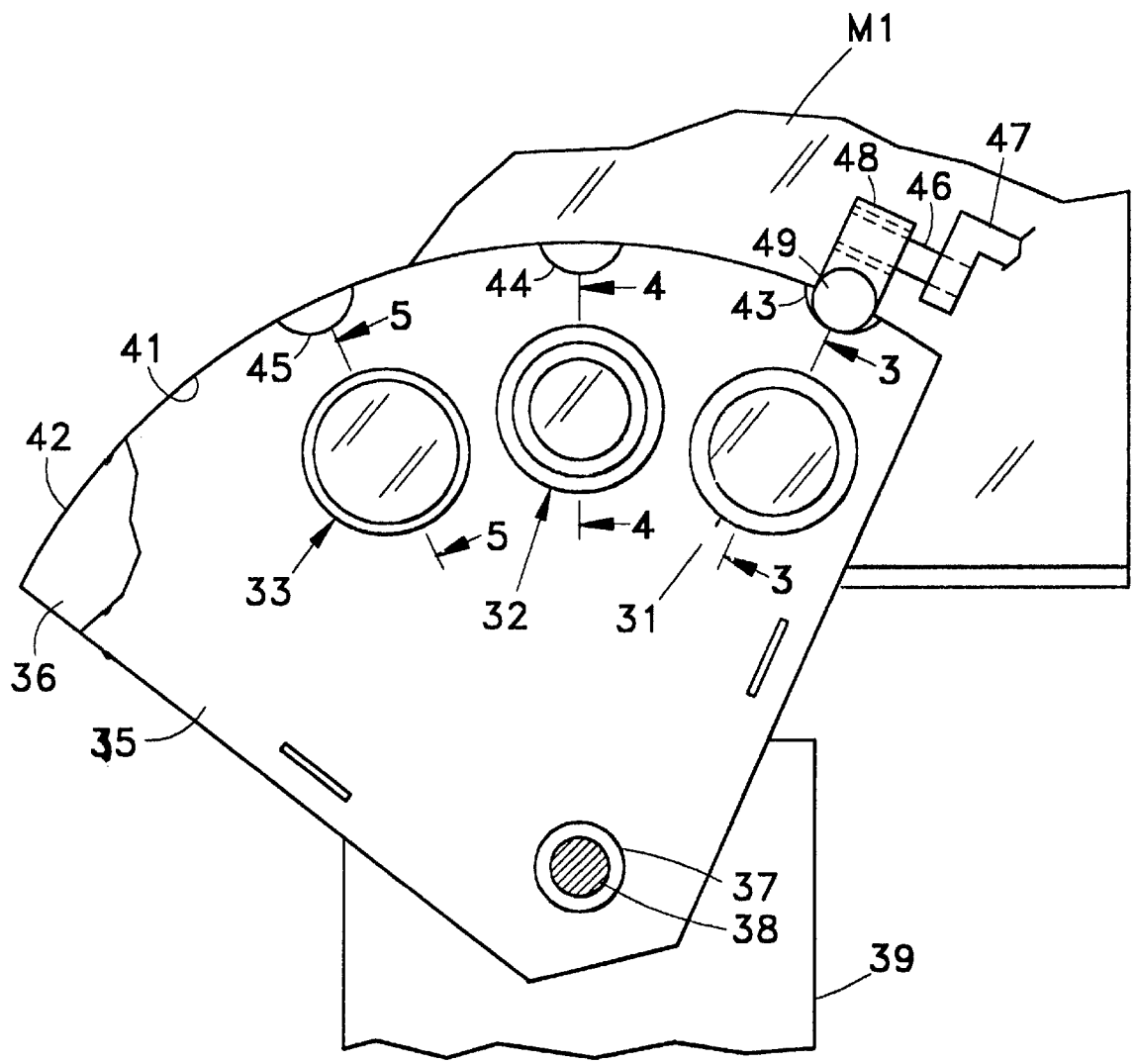
FIG. 2 is an enlarged, fragmentary sectional view taken generally along the line 2—2 in FIG. 1 looking in the direction of the arrows.

For example, as shown in FIG. 2, the three lenses 31, 32 and 33 are supported by the plates 35 and 36 with the axes thereof equi-spaced radially from the shaft 38, and disposed in spaced, parallel relation to each other, and equiangularly spaced from each other about the axis of the adjusting shaft 38. Plates 35 and 36 have arcuately shaped, registering upper ends 41 and 42, respectively; and the arcuate, upper edge 41 of plate 35 has therein three arcuate notches or recesses 43, 44 and 45. Like the lenses 31, 32 and 33, these notches 43, 44 and 45 are equiangularly spaced about the axis of shaft 38, and in such manner that the center points thereof line in radial planes containing the axis of shaft 38, and the axes of lenses 31, 32 and 33, respectively. Mounted above the upper ends of the plates 35 and 36 for limited pivotal movement about a pin 46 which projects from a stationary bracket 47 that projects from the sidewall of housing 10, is a lens retainer element 48. Retainer 48 has thereon a cylindrical projection 49 which is disposed to be releasably seated in one of the recesses 43, 44 and 45 when the lens associated therewith has been swung by the shaft 38 into an operative position between the beamsplitter 27 and the mirror M1. For example, as noted in FIG. 2, when the lens 31 is in its operative position the projection 49 is seated in the recess 43 associated with lens 31. In this position, a coiled compression spring, which is interposed between the shaft 46 and the element 48, resiliently retains the projection 49 in the recess 43. On the other hand when the shaft 38 is rotated to shift one or the other of the remaining lenses 32 and 33 into an operative position, the spring-loaded projection 49 is caused to slide across the arcuate upper end 41 of the plate 35 thereafter to become seated in one of the remaining recesses 44 or 45 releasably to hold the associated lens 32 or 33 in its operative position between the beamsplitter 27 and the mirror M1.

Figure 3:
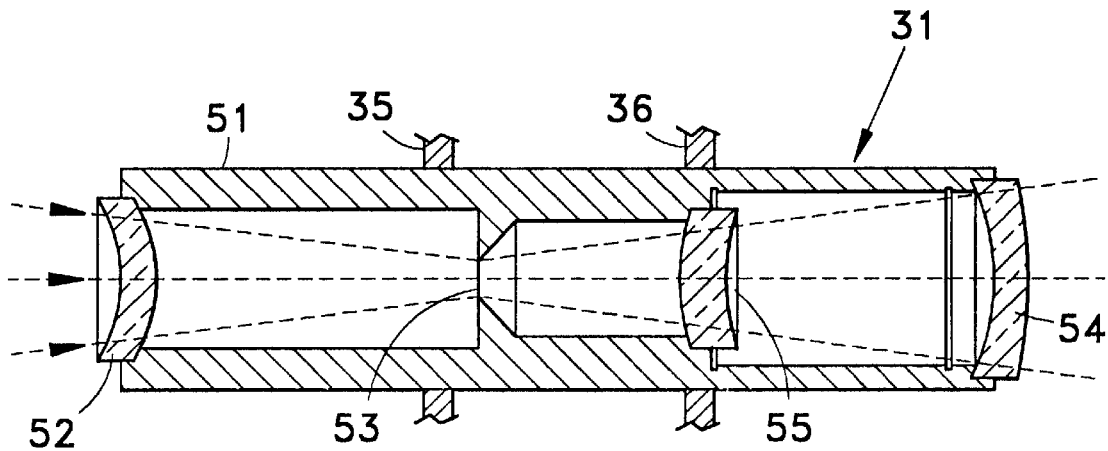
FIG. 3 is an enlarged, fragmentary sectional view taken generally along the line 3—3 in FIG. 2 looking in the direction of the arrows.

While the magnifications produced by the three adjustable lenses referred to above may be selected as desired, in the present embodiment the lenses 31, 32 and 33 have been selected to have magnifications of, respectively, 10×F/20, 20×F/10, and 50×F/4. Moreover, each such lens has an internal telecentric stop. For example, lens 31, as illustrated in FIG. 3, comprises a cylindrical barrel housing 51 having in one end thereof a meniscus inlet lens 52 disposed to have its outer surface face the beamsplitter 27, and with its inner surface facing a stop or reduced-diameter telecentric opening 53 formed in barrel 51 intermediate its ends. Secured in the opposite end of barrel 51 is a divergent lens 54 which faces in the direction of the mirror M1. Also secured in the barrel 51 between the lens 54 and the telecentric stop 53 is a meniscus lens 55. The lens elements in barrel 55 are not adjustable, so that at the outset when the contour projector is manufactured, either or both of the mirrors M1 and M2 are adjusted relative to the lens 31 when the latter is in its operative position. Thereafter lens 31 will require no adjustment.

Figure 4:
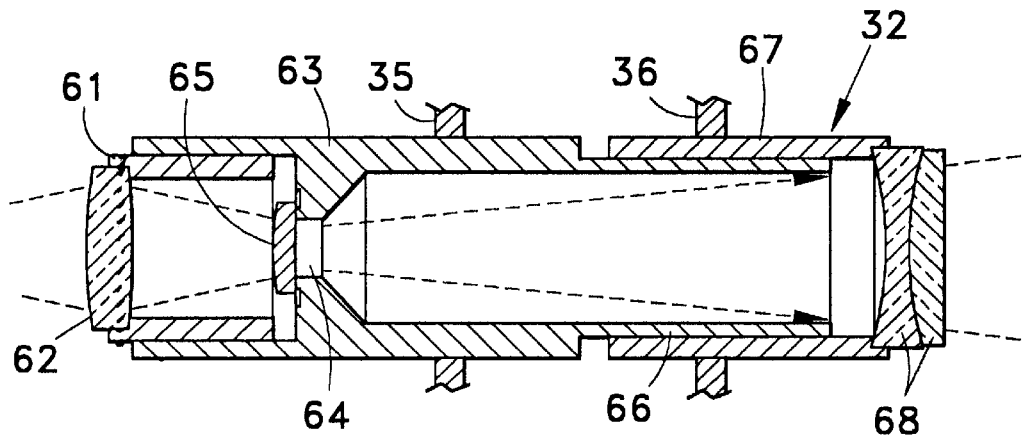
FIG. 4 is an enlarged, fragmentary sectional view taken generally along the line 4—4 in FIG. 2 looking in the direction of the arrows.

The remaining lenses 32 and 33, however, include lens elements which are adjustable during assembly of the projector in order to secure the desired 20× and 50× magnifications, respectively, and to provide parfocality, or common object focal plane. For example, as shown in FIG. 4 lens 32 has at its inlet end (its left end in FIG. 4) a first lens barrel 61 having secured in one end thereof a plano convex inlet lens 62, and having its opposite end secured adjustably and coaxially in the forward end of a second lens barrel 63 which is secured intermediate its ends in a registering opening in the lens supporting wall 35. Barrel 63 has formed in its bore a reduced-diameter telecentric stop opening 64 having secured coaxially thereover a small plano convex lens 65 that is disposed in spaced, confronting coaxially relation to the inlet lens 62. At its opposite end the barrel 63 has a reduced-diameter portion 66 which extends adjustably and coaxially into one end of another barrel member 67 which is mounted intermediate its ends in wall 36, and which has secured in its opposite end a doublet lens 68 that is disposed to be placed in confronting, registering relation to the reflective surface of the mirror M1, when lens 32 is in its operative position. As noted hereinafter, the barrel 67 is adapted to be adjusted axially relative to the barrel 63 to establish the 20× magnification of lens 32. Subsequent to such adjustment the barrel 67 is secured against movement in the supporting wall 36.

Figure 5:
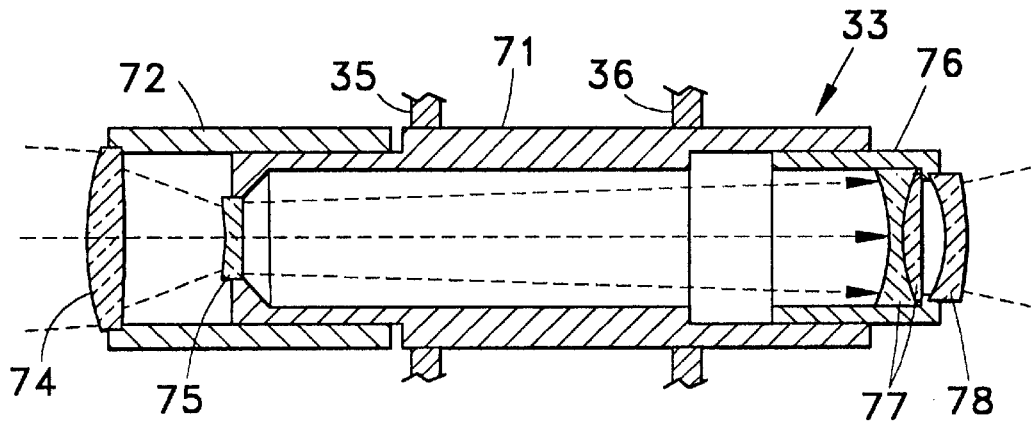
FIG. 5 is an enlarged, fragmentary sectional view taken generally along the line 5—5 in FIG. 2 looking in the direction of the arrows.

Referring to FIG. 5, the lens 33 includes a first cylindrical barrel 71 which is secured intermediate its ends in registering openings in the lens supporting walls 35 and 36, and which has another cylindrical lens barrel 72 adjustably secured at one end thereof coaxially over the forward or left end of barrel 71 as shown in FIG. 5. Barrel 72 has secured in its outer or left end as shown in FIG. 5 a plano convex inlet lens 74, which registers coaxially with a plano concave lens 75 that is secured over a reduced-diameter telecentric stop opening formed in the bore of barrel 71 at its left or outer end as shown in FIG. 5. Adjustably mounted at its inner end in the opposite end of barrel 71 coaxially thereof is another lens barrel 76 having secured coaxially therein adjacent its outer end a doublet lens 77, which confronts a meniscus lens 78 that is secured coaxially in the outer end of the barrel 76.

As noted above, upon assembly of the above-described optical comparator, the distance of the reflective surface of the mirror M1 to the lens 31, when the latter is in its operative position, is adjusted until lens 31 produces a magnification of 10× for the images projected thereby into mirror M1. Once this correct distance has been established, the barrels 61 and 67 are adjusted relative to the barrel 63 of lens 32 until lens 32, when in its operative position, functions to produce the desired 20× magnification of the images directed thereby onto mirror M1. Likewise at such time barrels 72 and 76 are adjusted relative to the barrel 71 in lens 33, when the latter is in its operative position, to establish that lens 33 will produce the desired 50× magnification of the images projected thereby onto mirror M1. When such adjustments have been finalized, of course, the various lens barrels of the lenses 32 and 33 are fixed relative to the supporting walls 35 and 36. Each resultant contour projector machine thus has a pre-adjusted family of telecentric parfocal magnification lenses that share the same common entrance doublet lens 26, and which are particularly suited for the respective machine. Although the lens units of a particular machine of the type described are not directly interchangeable with other lens units, nevertheless the machine is provided with at least three, selectively different magnifications, which in the embodiment illustrated have been selected as 10×, 20× and 50×.

From the foregoing it will be apparent that the present invention provides relatively simple and very reliable means for providing a contour projector with selectively different lens magnifications, thereby enabling the projected dual images in the above-described machine to be subjected to significantly large magnifications. Moreover, while in the present invention only three different magnification lens systems have been described in detail, it will be apparent that the number of such magnification lenses could be increased without departing from this invention. Also, while this invention has been illustrated and described in detail in connection with only certain embodiments thereof, it will be apparent that the present invention is capable of still further modification, and that this application is intended to cover any such modifications as may fall within the scope of one skilled in the art, or the appended claims.

I claim:

1. A contour projector, comprising
   a housing having therein a projection screen for observation by the projector operator,
   means for releasably mounting in an inspection position on said housing a workpiece that is to be inspected,
   a common entrance lens mounted in said housing to register with a workpiece located in said inspection position, and having an image inlet end thereof disposed to face one side of the registering workpiece,
   a plurality of magnification lenses adjustably mounted in said housing for movement relative to said entrance lens and selectively and one-by-one into an operative position in which an image inlet end of a respective magnification lens in said operative position is disposed in spaced, confronting, coaxial relation with respect to an image outlet end of said entrance lens,
   means for projecting combined images of the profile and said one side of said registering workpiece to said inlet end of said entrance lens for projection thereby through the magnification lens then located in said operative position, and
   further image projecting means including a mirror mounted in said housing to register with an image outlet end of said magnification lens located in said operative position, and operative to receive and to project said combined images in magnified form onto said projection screen.

2. A contour projector as defined in claim 1, wherein said entrance lens is a doublet lens.

3. A contour projector as defined in claim 1, wherein said means for projecting said combined images to the inlet end of said entrance lens comprises,
   a beam splitter interposed between the outlet end of said entrance lens and the inlet end of the magnification lens then in said operative position,
   means for projecting a first light beam onto said beam splitter for projection thereby through said entrance lens onto said one side of said registering workpiece to produce an image thereof, and
   means for projecting a second light beam onto the side of said registering workpiece opposite to said one side thereof thereby to produce said profile image.

4. A contour projector as defined in claim 1, including
   means mounting said magnification lenses in spaced, parallel relation to each other, and
   means for moving said mounting means in opposite directions and selectively to position one of said magnification lenses in said operative position.

5. A contour projector as defined in claim 1, including means operative upon movement of one of said magnification lenses into said operative position releasbly to secure the last-named magnification lens in said operative position.

6. A contour projector as defined in claim 1, wherein said magnification lenses are parfocal telecentric lenses, and include magnification values of 10×, 20× and 50×, respectively.

7. A contour projector as defined in claim 1, including a shaft mounted in said housing for limited pivotal movement about an axis spaced from and parallel to the optical axis of said entrance lens, and means mounting said magnification lenses on said shaft with the optical axes thereof disposed parallel to and equi-spaced radially from said shaft, said shaft being operable to swing said magnification lenses selectively in opposite directions about the axis of said shaft, and one-by-one into said operative position.

8. A contour projector as defined in claim 7, wherein said shaft projects at one end thereof to the exterior of said housing and is pivotal manually about its axis.

9. A contour projector as defined in claim 8, including means for releasably securing said shaft against pivotal movement each time one of said magnification lenses is moved into said operative position.

10. A contour projector as defined in claim 1, wherein each of said magnification lenses has a reduced-diameter telecentric opening formed therein intermediate its ends.

* * * * *